US012609978B2

(12) United States Patent
Fan et al.

(10) Patent No.: US 12,609,978 B2
(45) Date of Patent: Apr. 21, 2026

(54) INFORMATION PROCESSING METHOD AND APPARATUS AND ELECTRONIC DEVICE FOR SCREEN SHARING AUTHORIZATION

(71) Applicant: BEIJING ZITIAO NETWORK TECHNOLOGY CO., LTD., Haidian District (CN)

(72) Inventors: Chao Fan, Beijing (CN); Zhou Yu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 89 days.

(21) Appl. No.: 18/613,581

(22) Filed: Mar. 22, 2024

(65) Prior Publication Data

US 2024/0323242 A1 Sep. 26, 2024

(30) Foreign Application Priority Data

Mar. 24, 2023 (CN) .......................... 202310309285.6

(51) Int. Cl.
*H04L 65/60* (2022.01)
*G06F 21/62* (2013.01)
(52) U.S. Cl.
CPC .......... *H04L 65/60* (2013.01); *G06F 21/6218* (2013.01)
(58) Field of Classification Search
None
See application file for complete search history.

(56) References Cited

U.S. PATENT DOCUMENTS

| | | | | |
|---|---|---|---|---|
| 9,021,367 B2 * | 4/2015 | Chan | ...................... | G06F 3/1454 |
| | | | | 715/759 |
| 9,325,571 B2 * | 4/2016 | Chen | ........................ | G06F 9/468 |
| 9,348,984 B2 * | 5/2016 | Peled | .................. | G06F 21/6245 |
| 9,525,692 B2 * | 12/2016 | Gaudet | ................. | H04L 63/101 |
| 9,699,271 B2 * | 7/2017 | Brander | ............. | G06F 21/6245 |
| 9,996,367 B1 * | 6/2018 | Bao | ............................ | G06F 3/14 |
| 10,110,522 B1 * | 10/2018 | Mesters | ................. | H04L 51/18 |
| 10,165,022 B1 * | 12/2018 | Hubbard | .............. | G06F 3/1454 |
| 10,230,731 B2 * | 3/2019 | Weaver | ................. | G06F 40/166 |
| 10,412,434 B1 * | 9/2019 | Matthews | .......... | H04N 21/4394 |
| 10,949,392 B2 * | 3/2021 | Boutnaru | ............ | H04L 63/0428 |
| 11,074,364 B2 * | 7/2021 | Baruch | .............. | G06F 21/6245 |

(Continued)

FOREIGN PATENT DOCUMENTS

| | | |
|---|---|---|
| CN | 109145530 A | 1/2019 |
| CN | 109669924 A | 4/2019 |

(Continued)

*Primary Examiner* — Backhean Tiv
(74) *Attorney, Agent, or Firm* — Alleman Hall LLP

(57) ABSTRACT

The embodiments of the present invention provide an information processing method and apparatus, and an electronic device, the method comprising: receiving screen sharing request information; determining, by the screen sharing request information, whether an online content that meets a preset condition exists in a currently displayed content in a screen; providing, in response to determining that the online content exists in the currently displayed content and that the online content is a currently shared content, a sharee with access information for accessing the online content based on an access authority of the sharee.

20 Claims, 7 Drawing Sheets

(56) References Cited

U.S. PATENT DOCUMENTS

| | | | | |
|---|---|---|---|---|
| 11,212,127 B2 * | 12/2021 | Chanda | H04L 65/4015 | |
| 11,330,026 B1 * | 5/2022 | Han | H04L 65/1093 | |
| 11,469,892 B2 * | 10/2022 | Song | H04L 63/08 | |
| 11,579,832 B2 * | 2/2023 | Nakamura | G06F 3/04883 | |
| 11,616,814 B2 * | 3/2023 | Schrager | G06T 11/60 | |
| | | | 726/1 | |
| 11,797,320 B2 * | 10/2023 | Yanez | G06F 9/452 | |
| 12,019,775 B2 * | 6/2024 | Paul | H04N 1/444 | |
| 12,130,895 B2 * | 10/2024 | Kidd | G06F 3/0482 | |
| 12,170,860 B2 * | 12/2024 | Brudy | H04N 7/152 | |
| 12,314,627 B1 * | 5/2025 | Browne | G06F 3/147 | |
| 12,346,466 B2 * | 7/2025 | Zhang | H04N 7/15 | |
| 2005/0091611 A1 * | 4/2005 | Colleran | G06F 11/1415 | |
| | | | 715/764 | |
| 2006/0208871 A1 * | 9/2006 | Hansen | G06F 3/1454 | |
| | | | 709/219 | |
| 2008/0126359 A1 * | 5/2008 | Rhoads | H04L 67/563 | |
| 2009/0210945 A1 * | 8/2009 | Kato | G06F 12/1491 | |
| | | | 726/26 | |
| 2010/0058481 A1 * | 3/2010 | Yagita | G06F 21/84 | |
| | | | 709/204 | |
| 2010/0325413 A1 * | 12/2010 | Chandramouli | H04N 21/8586 | |
| | | | 715/835 | |
| 2011/0035783 A1 * | 2/2011 | Terasaki | G06F 21/554 | |
| | | | 726/1 | |
| 2011/0149809 A1 * | 6/2011 | Narayanaswamy | | |
| | | | H04L 12/1818 | |
| | | | 379/202.01 | |
| 2012/0011451 A1 * | 1/2012 | Bansal | H04L 12/1827 | |
| | | | 715/753 | |
| 2012/0131495 A1 * | 5/2012 | Goossens | G06F 3/0482 | |
| | | | 715/781 | |
| 2013/0007895 A1 * | 1/2013 | Brolley | G06F 21/62 | |
| | | | 726/28 | |
| 2014/0033073 A1 * | 1/2014 | Pegg | H04L 65/613 | |
| | | | 709/204 | |
| 2014/0047025 A1 * | 2/2014 | Jones | H04L 12/1822 | |
| | | | 709/204 | |
| 2015/0244682 A1 * | 8/2015 | Biswas | H04L 63/104 | |
| | | | 726/26 | |
| 2016/0291915 A1 * | 10/2016 | Panchapakesan | G06F 3/1454 | |
| 2018/0121663 A1 * | 5/2018 | Hassan | G06F 21/84 | |
| 2018/0234700 A1 * | 8/2018 | Kim | H04N 19/597 | |
| 2018/0253325 A1 * | 9/2018 | Bao | G06F 9/452 | |
| 2018/0357440 A1 * | 12/2018 | Brady | H04L 63/08 | |
| 2019/0163927 A1 * | 5/2019 | Kochura | G06F 40/151 | |
| 2020/0019716 A1 * | 1/2020 | Leonard | H04L 63/105 | |
| 2021/0097208 A1 * | 4/2021 | Donahue | G06F 21/84 | |
| 2021/0099488 A1 * | 4/2021 | Schrager | H04L 63/20 | |
| 2021/0243045 A1 * | 8/2021 | Chen | G06F 16/93 | |
| 2021/0365589 A1 * | 11/2021 | Qiao | G06F 21/84 | |
| 2022/0309183 A1 * | 9/2022 | Jose | G06F 21/6245 | |
| 2022/0358191 A1 * | 11/2022 | Balmakhtar | G06F 21/6245 | |
| 2022/0360463 A1 * | 11/2022 | Wilson | G06F 9/452 | |
| 2022/0397985 A1 * | 12/2022 | Singh | G06F 3/0481 | |
| 2023/0161539 A1 * | 5/2023 | Chung | G10L 15/26 | |
| | | | 715/709 | |
| 2023/0367534 A1 * | 11/2023 | Cui | G06F 3/1454 | |
| 2024/0323242 A1 * | 9/2024 | Fan | H04L 65/60 | |
| 2024/0370218 A1 * | 11/2024 | Chen | G06F 3/1454 | |

FOREIGN PATENT DOCUMENTS

| | | |
|---|---|---|
| CN | 114064593 A | 2/2022 |
| CN | 114760347 A | 7/2022 |

* cited by examiner

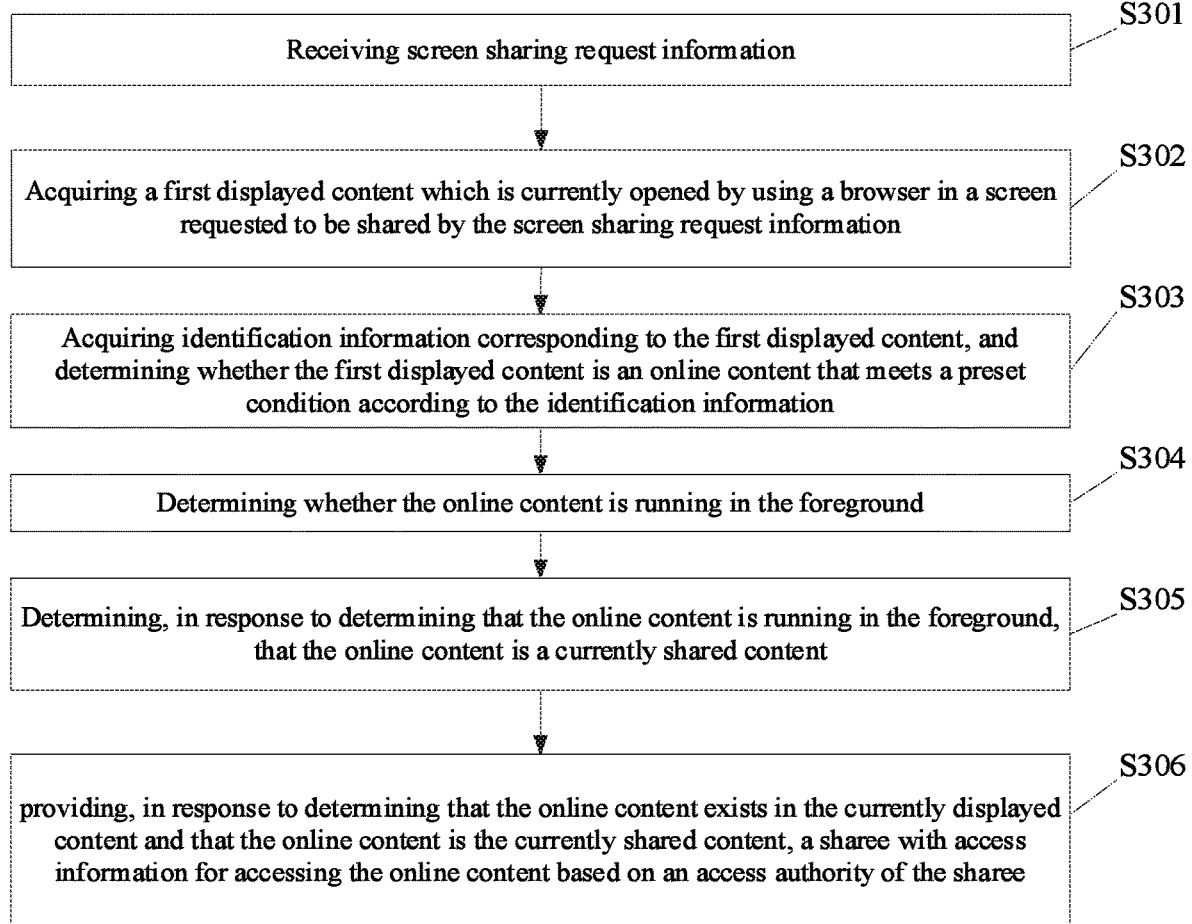

S301

Receiving screen sharing request information

S302

Acquiring a first displayed content which is currently opened by using a browser in a screen requested to be shared by the screen sharing request information

S303

Acquiring identification information corresponding to the first displayed content, and determining whether the first displayed content is an online content that meets a preset condition according to the identification information

S304

Determining whether the online content is running in the foreground

S305

Determining, in response to determining that the online content is running in the foreground, that the online content is a currently shared content

S306 providing, in response to determining that the online content exists in the currently displayed content and that the online content is the currently shared content, a sharee with access information for accessing the online content based on an access authority of the sharee

FIG. 3

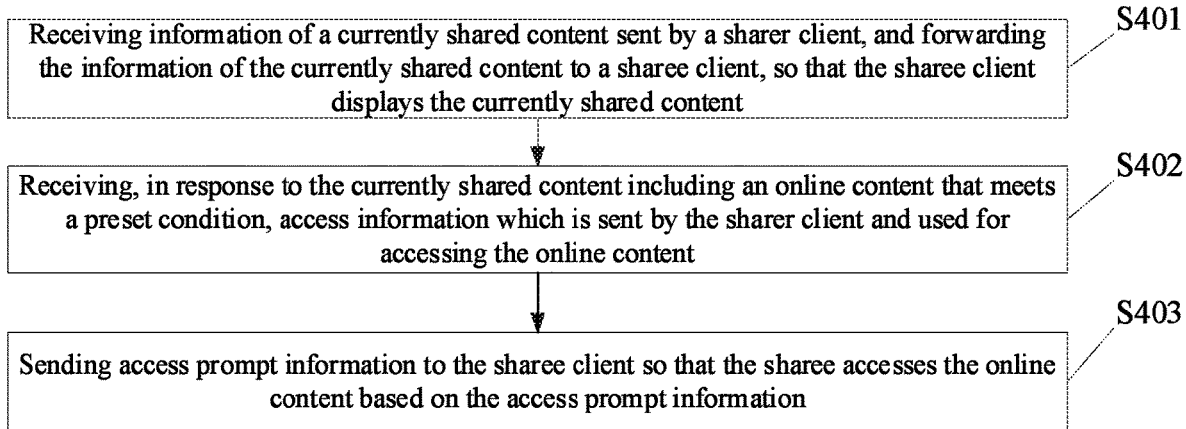

Receiving information of a currently shared content sent by a sharer client, and forwarding the information of the currently shared content to a sharee client, so that the sharee client displays the currently shared content                                         S401

Receiving, in response to the currently shared content including an online content that meets a preset condition, access information which is sent by the sharer client and used for accessing the online content                                         S402

Sending access prompt information to the sharee client so that the sharee accesses the online content based on the access prompt information                                         S403

FIG. 4

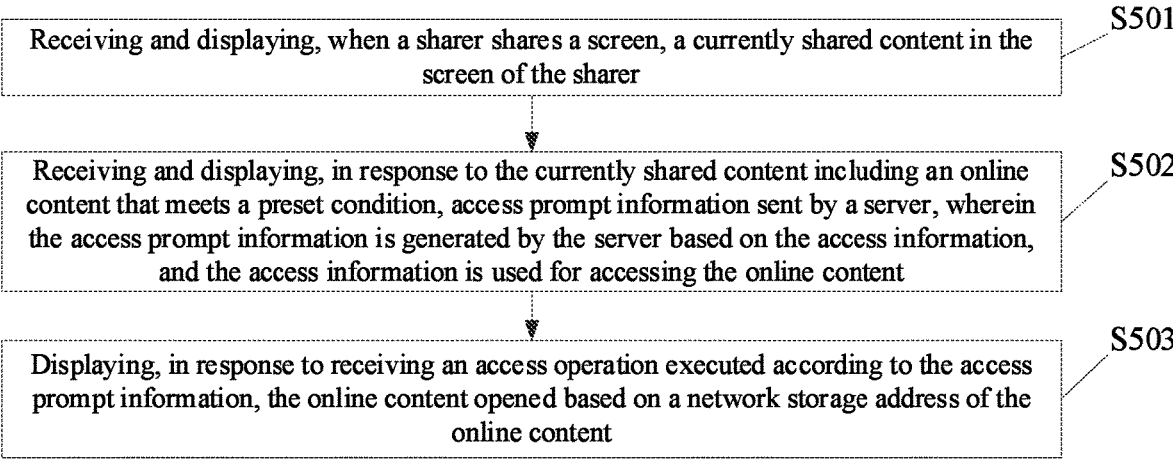

Receiving and displaying, when a sharer shares a screen, a currently shared content in the screen of the sharer ⟋S501

Receiving and displaying, in response to the currently shared content including an online content that meets a preset condition, access prompt information sent by a server, wherein the access prompt information is generated by the server based on the access information, and the access information is used for accessing the online content ⟋S502

Displaying, in response to receiving an access operation executed according to the access prompt information, the online content opened based on a network storage address of the online content ⟋S503

FIG. 5

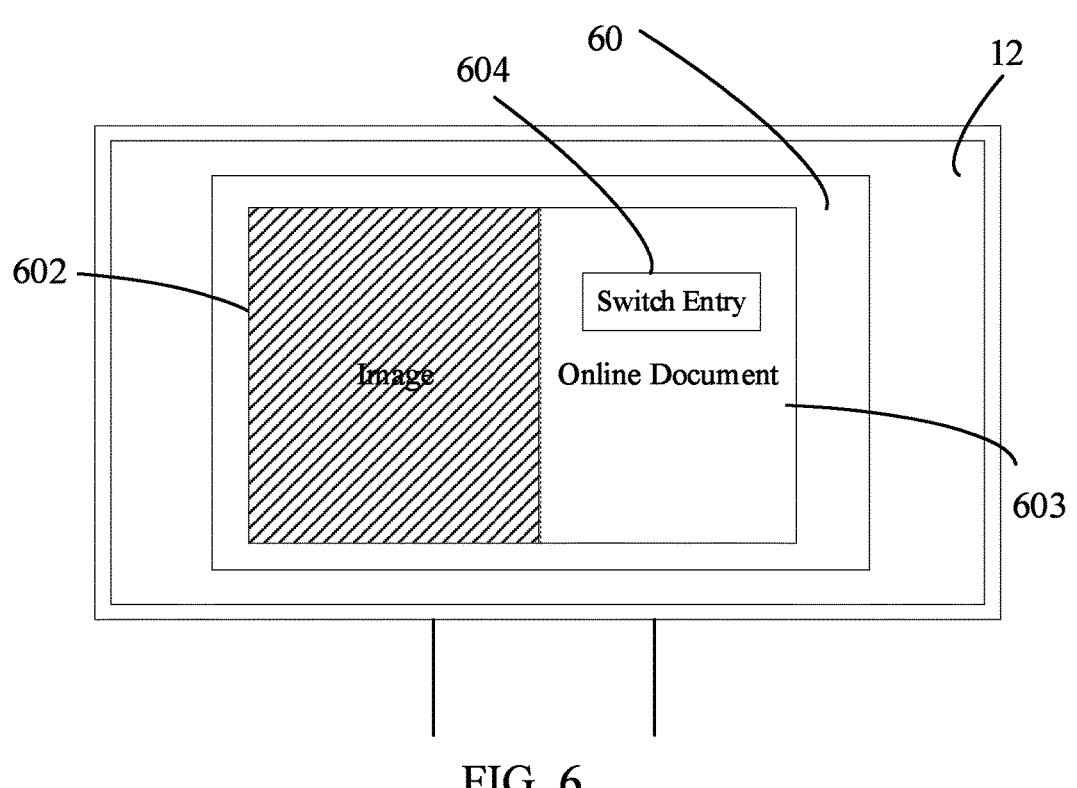

Switch Entry

Online Document

FIG. 6

INFORMATION PROCESSING METHOD AND APPARATUS AND ELECTRONIC DEVICE FOR SCREEN SHARING AUTHORIZATION

CROSS-REFERENCE TO RELATED APPLICATIONS

This application claims priority to Chinese patent application No. 202310309285.6 filed on Mar. 24, 2023 with the Chinese Patent Office, the entire content of which is incorporated into this application by reference.

TECHNICAL FIELD

Embodiments of the present disclosure relate to the field of Internet technology, and in particular an information processing method and apparatus, and an electronic device.

BACKGROUND

In many application scenarios, there is a need to perform screen sharing (also referred to as desktop sharing). Screen sharing is the sharing of a screen content between one device and another, or among multiple devices. Through screen sharing, contents can be presented to other users without sending files.

The existing screen sharing is to generate a data packet for information on a screen of a sharer device, and the data packet is sent to other devices via network. A sharee device reconstructs the image on the screen of the sharer device.

SUMMARY

Embodiments of the present disclosure provide an information processing method and apparatus, and an electronic device.

In a first aspect, an embodiment of the present disclosure provides an information processing method, the method including: receiving screen sharing request information; determining, by the screen sharing request information, whether an online content that meets a preset content condition exists in a currently displayed content in a screen; and providing, in response to determining that the online content exists in the currently displayed content and that the online content is a currently shared content, a sharee with access information for accessing the online content based on an access authority of the sharee.

In a second aspect, an embodiment of the present disclosure provides an information processing method, the method including: receiving information of a currently shared content sent by a sharer client, and forwarding the information of the currently shared content to a sharee client so that the sharee client displays the currently shared content; receiving, in response to the currently shared content including an online content that meets a preset condition, access information which is sent by the sharer client and used for accessing the online content; and sending access prompt information to the sharee client so that the sharee accesses the online content based on the access prompt information.

In a third aspect, an embodiment of the present disclosure provides an information processing method, the method including: receiving and displaying, when a sharer shares a screen, a currently shared content in the screen of the sharer; receiving and displaying, in response to the currently shared content including an online content that meets a preset condition, access prompt information sent by a server, wherein the access prompt information is generated by the server based on access information which is used for accessing the online content; and displaying, in response to receiving an access operation executed according to the access prompt information, the online content opened based on a network storage address of the online content.

In a fourth aspect, an embodiment of the present disclosure provides an information processing apparatus, the apparatus including: a first receiving unit for receiving screen sharing request information; a first determining unit for determining, by the screen sharing request information, whether an online content that meets a preset condition exists in a currently displayed content in a screen; and a providing unit for providing, in response to determining that the online content exists in the currently displayed content and that the online content is a currently shared content, a sharee with access information for accessing the online content based on an access authority of the sharee.

In a fifth aspect, an embodiment of the present disclosure provides an information processing apparatus, the apparatus including: a forwarding unit for receiving information of a currently shared content sent by a sharer client, and forwarding the information of the currently shared content to a sharee client so that the sharee client displays the currently shared content; a first sending unit for receiving, in response to the currently shared content including an online content that meets a preset condition, access information which is sent by the sharer client and used for accessing the online content; and a second sending unit for sending access prompt information to the sharee client so that the sharee accesses the online content based on the access prompt information.

In a sixth aspect, an embodiment of the present disclosure provides an information processing apparatus, the apparatus including: a second receiving unit for receiving and displaying, when a sharer shares a screen, a currently shared content in the screen of the sharer; a first displaying unit for receiving and displaying, in response to the currently shared content including an online preset content that meets a preset condition, access prompt information sent by a server, wherein the access prompt information is generated by the server based on access information which is used for accessing the online content; and a second displaying unit for displaying, in response to receiving an access operation executed according to the access prompt information, the online content opened based on a network storage address of the online content.

In a seventh aspect, an embodiment of the present disclosure provides an electronic device, including: a memory which stores computer executable instructions; and a processor which executes the computer executable instructions stored in the memory so that the at least one processor executes the information processing method according to the above first, second, and third aspects and various possible information processing methods of the first, second, and third aspects.

In an eighth aspect, an embodiment of the present disclosure provides a computer readable storage medium, which stores therein computer executable instructions, and a processor, when executing the computer executable instructions, implements the information processing method according to the above first, second, and third aspects and various possible information processing methods of the first, second, and third aspects.

In a ninth aspect, an embodiment of the present disclosure provides a computer program product, including a computer program, which, when being executed by a processor, executes the information processing method according to the above first, second, and third aspects and various possible information processing methods of the first, second, and third aspects.

In the information processing method and apparatus and the electronic device provided by the present disclosure, by receiving screen sharing request information; determining, by the screen sharing request information, whether an online content that meets a preset condition exists in a currently displayed content in a screen; and providing, in response to determining that the online content exists in the currently displayed content and that the online content is a currently shared content, a sharee with access information for accessing the online content based on an access authority of the sharee, a function that the sharee can actively access the online preset content in screen sharing is thus provided. Since the sharee can actively access the online content that meets a preset condition, the displaying of the online content at the sharee end is not influenced any more by the definition of the screen of the sharer, the encoding and decoding algorithm, and the network bandwidth for transmitting screen pictures, the above online content can be clearly displayed, and the problem of a poor definition of the shared content during the screen sharing is solved to a certain extent. In addition, since the sharee can freely browse the online preset content according to the above access information, the visibility of the online content which is a shared content is not limited by the sharer client any more. The problems that the content visibility of the sharee end is limited by the sharer client and the sharee has a low degree of freedom during screen sharing are solved to a certain extent.

BRIEF DESCRIPTION OF THE DRAWINGS

In order to more clearly illustrate the embodiments of the present disclosure or the technical solutions in the prior art, the drawings to be used in the embodiments or the description of the prior art will be briefly described below, and it is obvious that the drawings in the following description are some embodiments of the present disclosure, and according to these drawings, those skilled in the art can obtain other drawings without creative efforts.

FIG. 3 is a second schematic flowchart of an information processing method provided by an embodiment of the present disclosure;

FIG. 4 is a schematic flowchart of an information processing method provided by an embodiment of the present disclosure;

FIG. 5 is a schematic flowchart of an information processing method provided by an embodiment of the present disclosure;

FIG. 6 is a schematic diagram of an application scenario;

DETAILED DESCRIPTION

To make the objects, technical solutions and advantages of the embodiments of the present disclosure more clear, the technical solutions in the embodiments of the present disclosure will be described clearly and completely in combination with the drawings in the embodiments of the present disclosure. Obviously, the described embodiments are part, but not all of the embodiments of the present disclosure. All the other embodiments, which can be obtained by those skilled in the art based on the embodiments in the present disclosure without inventive efforts, fall into the protection scope of the present disclosure.

Screen sharing needs to be used in many application scenarios, such as scenarios of online education, multimedia conferences, and the like. Taking a multimedia conference as an example, in a multimedia conference scenario, in order to demonstrate documents, pictures, and other conference contents, which facilitate participants to understand, to a plurality of participants, to make the conference have better effect, screen sharing can be used in the multimedia conference scenario.

The screen sharing can be sharing of at least a partial region of the screen. Screen sharing can be performed using a preset application client. In some application scenarios, the above preset application can be an application supporting multimedia conferences, for example. Generally, screen sharing can include two parts, screen capture and video stream push. During screen sharing, there is a need to capture a screen picture in real time, and divide the screen picture into a plurality of encoded data packets to be sent to a terminal device of a sharee. The sharee client can reconstruct the screen picture after decoding the plurality of data packets.

Figure 1:
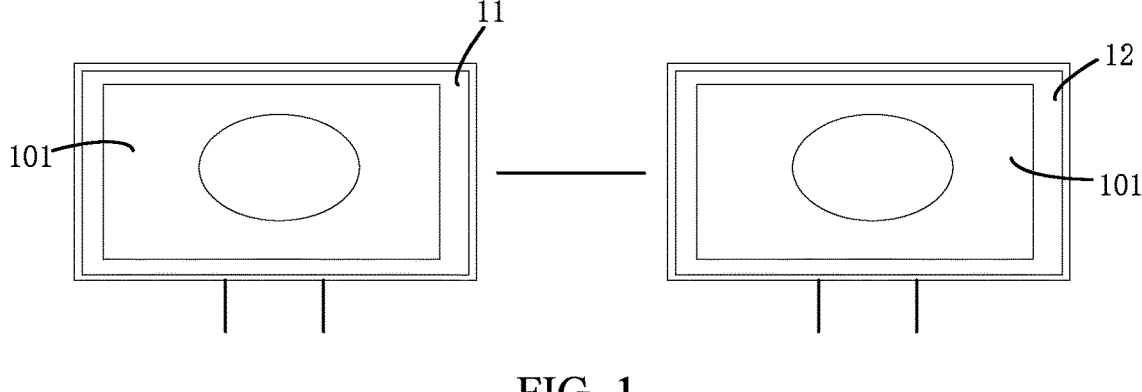
FIG. 1 is a schematic diagram of an application scenario.

FIG. 1 shows a schematic diagram of an application scenario of screen sharing. As shown in FIG. 1, the picture of a screen 11 of a terminal device of a sharer is a picture 101, and after the sharer uses a screen sharing client to share the screen to a sharee, the picture 101 can be displayed in a screen 12 of the terminal device of the sharee.

In this process, the sharee client possibly has the problem of limited definition and fluency when displaying the reconstructed screen picture due to the influence of the screen definition of the sharer, the encoding and decoding algorithm, and the network bandwidth for transmitting screen pictures.

In addition, the scope of the shared content that is visible to the sharee will also be limited by the scope of the shared content that is displayed by the sharer.

Furthermore, the content viewed by the sharee is only limited by operation of the sharer, a sharee cannot decide which parts of the shared content are viewed through his/her own active operation, and cannot stay longer on the contents which the sharee is of more interest. Therefore, the sharee has a low degree of freedom in browsing the shared content.

According to the information processing method provided by the present disclosure, after the sharer initiates screen sharing, if it is determined that the shared content includes the online content, access information for accessing the online content can be provided to the sharee, so that the sharee can obtain the capability of freely browsing the shared online content, which solves the problems of a poor definition of the shared content, a limitation of content visibility by the sharer client, and a low degree of freedom of the sharee during screen sharing to a certain extent.

Figure 2:
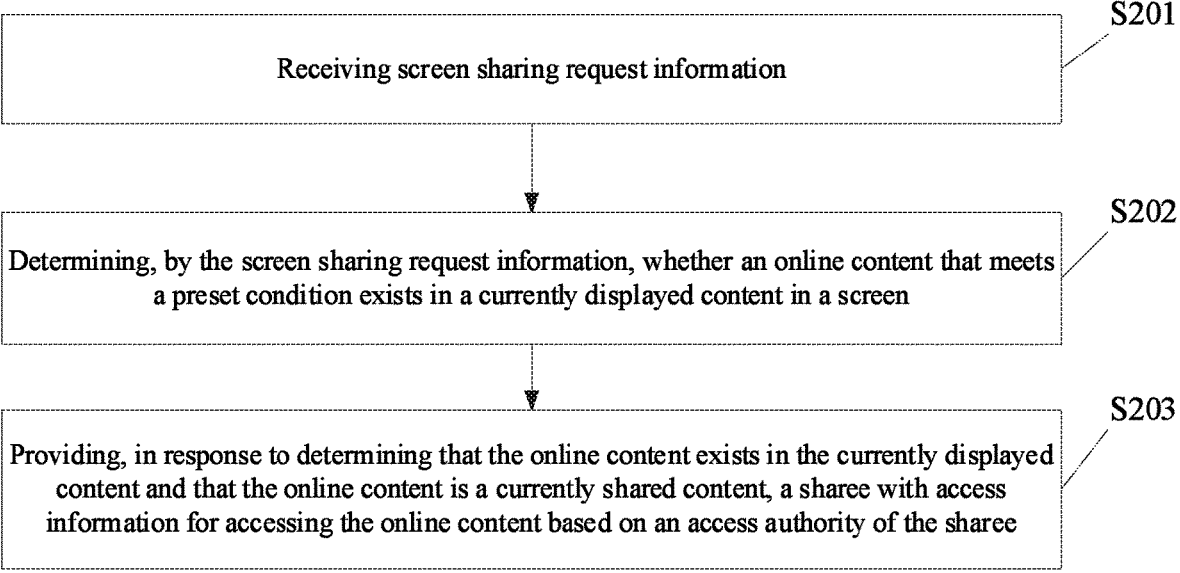
FIG. 2 is a first schematic flowchart of an information processing method provided by an embodiment of the present disclosure.

Please refer to FIG. 2, which illustrates a first schematic flowchart of the information processing method provided by the present disclosure. As shown in FIG. 2, the information processing method includes the following steps of:

S201: receiving screen sharing request information.

An execution subject of the present embodiment can be a terminal device, and specifically can be a client running on the terminal device and supporting screen sharing.

In some application scenarios, an initiator of the above screen sharing request can be a user (sharer) using the above terminal device. In these application scenarios, the user can send a screen sharing request to the above execution subject at the above terminal device. For example, the user executes a trigger operation on a screen sharing control in the client to send screen sharing request information to the above execution subject.

In some application scenarios, the above screen sharing request information can be sent by other electronic device that implements a communication connection with the above execution subject. As one implementation, the user can send the above screen sharing request information to the above execution subject using the above other electronic device.

In some application scenarios, a sharee corresponding to the above screen sharing request information can be predetermined or can be temporarily designated. As one implementation, the above sharee can be predetermined or temporarily designated by a server. As another implementation, the above sharee can be predetermined or temporarily designated by the sharer who initiates the sharing.

Taking a multimedia conference as an example, the above sharee can be a participant of the multimedia conference determined by the server.

In these above application scenarios, after receiving the screen sharing request information, the above execution subject can send picture generation encoded data of the home screen to the sharee.

S202: determining, by the screen sharing request information, whether an online content that meets a preset condition exists in a currently displayed content in a screen.

The above screen sharing request information can request full screen sharing or can request partial region screen sharing.

The above partial region screen sharing can be implemented by specifying, in the screen sharing request information, which regions in the screen are to be shared. The full screen sharing can be implemented by specifying a whole screen to be shared in the screen sharing request information.

The above currently displayed content can be a displayed content displayed in the above shared full screen or partial region screen.

The above displayed content can include a picture, a video and/or a document content, and etc.

The above online content can include various online contents. The online content can include, for example, an online audio/video, an online picture, an online document, and etc. As an example, the above online content can be an online document, for example.

Whether the online content exists in the currently displayed content can be recognized according to various recognition methods, for example, according to whether the displayed content is opened by a browser and the displayed content opened by the browser is matched with the preset content, it can be determined that the displayed content is the online content.

S203: providing, in response to determining that the online content exists in the currently displayed content and that the online content is a currently shared content, a sharee with access information for accessing the online content based on an access authority of the sharee.

After it is determined that the online content exists in the currently displayed content and that the online content is the currently shared content, according to the above step S202, if the sharee has the access authority for the currently shared content, the sharee can be provided with access information for serving the online content.

Here, the access authority of the sharee can be given in advance before the information processing method of the present embodiment is executed, or can be given during the execution of the information processing method of the present embodiment.

Taking a multimedia conference scenario as an example, the sharer or the server can give an access authority for the above online content to participants of the multimedia conference in advance, or the sharer or the server can give an access authority for the online content to the sharee during the conference.

The above access information can be various information that enables the sharee to access the online content, for example, identification information of the online content (for example, information that can uniquely identify the online content, such as a website of the online content), and the like.

The present embodiment includes receiving screen sharing request information; determining, by the screen sharing request information, whether an online content that meets a preset condition exists in a currently displayed content in a screen; and providing, in response to determining that the online content exists in the currently displayed content and that the online content is a currently shared content, a sharee with access information for accessing the online preset content based on an access authority of the sharee. In the above manner, after the sharer initiates screen sharing, if it is determined that the shared content includes an online content that meets a preset condition, access information for accessing the online preset content can be provided to the sharee, so that a function that the sharee can actively access the online content during the screen sharing is provided. Since the sharee can actively access the online content, the displaying of the online content at the sharee end is not influenced any more by the definition of the screen of the sharer, the encoding and decoding algorithm, and the network bandwidth for transmitting screen pictures, and the above online content can be clearly displayed, which solves the problem of a poor definition of the shared content during the screen sharing to a certain extent. In addition, since the sharee can freely browse the online content according to the above access information, the visibility of the online content, which is a shared content, is not limited by the sharer client any more. The problems that the content visibility of the sharee end is limited by the sharer client and the sharee has a low degree of freedom during screen sharing are solved to a certain extent.

Please refer to FIG. 3, which illustrates a second schematic flowchart of the information processing method provided by the present disclosure. As shown in FIG. 3, the information processing method includes the following steps of:

S301: receiving screen sharing request information.

An execution subject of the information processing method can be various terminal devices, and particularly the above execution subject can be an application client which implements screen sharing.

For the specific implementation of the step S301, reference may be made to related parts of the embodiment shown in FIG. 2, which is not described herein again.

S302: acquiring a first displayed content which is currently opened by using a browser in a screen requested to be shared by the screen sharing request information.

The above screen requested to be shared by the screen sharing request information can be a whole screen or a partial region screen.

The above execution subject can acquire information of at least one displayed content in the screen, and determine a first displayed content opened by using a browser from the at least one displayed content according to the information of the at least one displayed content.

As one implementation, the currently displayed content in the above screen is opened in form of a window. In such implementation, the operating system running on the terminal device can assign a window handle to each window. The above execution subject can acquire a window handle of each window in the currently displayed content in the above screen via a corresponding Application Programming Interface (API) provided by the operating system, and further recognize whether the window is a window opened in the browser through the window handle.

In the above manner, the first displayed content opened by using the browser in the above screen can be determined.

S303: acquiring identification information corresponding to the first displayed content, and determining whether the first displayed content is an online content that meets a preset condition according to the identification information.

The identification information corresponding to the displayed content here can include a title of the displayed content. Whether the above first displayed content is an online content that meets a preset condition can be determined according to the above title.

In some embodiments, the step S303 includes the following steps of:

firstly, acquiring a first displayed content currently opened by using a browser in the screen;

secondly, acquiring identification information corresponding to the first displayed content, and determining whether the first displayed content is an online content that meets a preset condition according to the identification information.

For example, the above identification information can be sent to a server, and the server matches the above identification information with a plurality of identifications of online contents pre-stored, and determines whether the first displayed content is the online content according to a matching result.

Taking the online content as an online document as an example, a server (for example, a server providing an online document service) can set an online document identification for each online document. The online document identifications can distinguish between different online documents.

The above execution subject can acquire the identification information of the first displayed content in various manners after determining the first displayed content. Depending on characteristics of a web browser, when a web page window is in a front end display state, an identification of the web page will appear in the title of the browser window as well. The above execution subject can read the title portion of the browser window via a related system API interface, thereby acquiring the identification information of the first displayed content.

The above execution subject can send the identification information of the first displayed content to the server, and the server performs matching in the online document library according to the above identification information, and if the matching is successful, then it can be determined the first displayed content is an online document.

In some embodiments, the above step S303 includes the following steps:

firstly, detecting whether a steganographic character exists in the identification information;

secondly, determining, in response to detecting that a steganographic character exists in the identification information, whether the first displayed content is the online content according to the steganographic character.

In these embodiments, for the safety of the first displayed content, the server of the first displayed content can set, when setting the identification information of the first displayed content, steganographic characters therein. The steganographic characters herein can be, for example, zero-width characters.

A steganographic character string can include real identification information corresponding to the first displayed content at the server. The above execution subject can read the above steganographic character string by presetting a steganographic character reading mode, and send the above steganographic character string to the server which recognizes the real identification information of the above first displayed content.

The above execution subject can send the identification information represented by the steganographic character string to the server which determines whether it is the online content.

In these embodiments, the identification information of the above online content is inserted with a steganographic character. In this way, the client recognizes the above steganographic character before sending the steganographic character to the server, and the server recognizes the online content information corresponding to the above steganographic character. In this way, the safety of the online content is improved.

S304: determining whether the online content is running in the foreground.

In some implementations, the above execution subject can determine whether the above online content is running in the foreground by a foreground window running recognition function provided by an operating system of the terminal device.

In some embodiments, the above step S304 can include the following sub-steps:

firstly, determining an area of a browser window displaying the online content which is blocked by other windows;

secondly, determining a ratio of the browser window which is blocked according to the area;

finally, determining, in response to determining that the ratio is smaller than a preset ratio threshold, that the online content is running in the foreground.

The above execution subject can call a related interface of the above operating system to acquire display position information of the browser window of the online content and display position information of other windows.

Whether the window of the browser is overlapped with other window is determined according to the above position information. If not overlapped, the area of the browser window which is blocked by other window can be considered as 0, and the above ratio is also 0, and it can be directly determined that the online content is running in the foreground. If overlapped, then the area of the above overlapped portion can be determined. The ratio of the browser window which is blocked is determined according to the area S1 of the above overlapped portion and the area S2 of the browser window. The above ratio can be equal to a value obtained from S1/S2.

The above preset ratio threshold can be, for example, 30%, 50%, etc. The above preset ratio threshold can be set according to a specific application scenario, and is not limited herein.

In these embodiments, whether the browser window displaying the online content is running in the foreground is determined by means of determining the ratio of the browser window of the online content which is blocked, and when a plurality of displayed contents are displayed on the screen, whether the above online content is a shared content can be accurately determined from the plurality of displayed contents.

In some embodiments, the above step S304 can include the following sub-steps:

firstly, dynamically setting a plurality of preset marks for a window displaying the online content;

secondly, determining, based on blocking information that the plurality of preset marks are blocked by other windows, that the online content is running in the foreground.

The above execution subject can acquire a display position of a window displaying the above online content via a related API interface provided by an operating system. Further, the above execution subject can set a plurality of preset marks for the window displaying the online content.

As one implementation, a size of the window displaying the online content can be determined according to the above display position of the window. Then, positions corresponding to the plurality of preset marks respectively are determined according to the above size. Then, the above preset marks are set according to the above positions.

When the above window size is changed, the positions corresponding to the plurality of preset marks respectively can be determined according to the above changed window size.

As one implementation, when the above positions corresponding to the plurality of preset marks respectively are determined, the positions corresponding to the plurality of preset marks respectively can be set at identical intervals.

As another implementation, a plurality of preset marks can be set at positions near edges of the window displaying the online content. For example, a plurality of preset marks are set at at least one of a first position near a left edge, a second position near a right edge, a third position near an upper edge, and a fourth position near a lower edge.

As another implementation, a plurality of preset marks can be set in a central region of the window displaying the online content.

The above execution subject can acquire a display position of other window from the system via a related API interface provided by the operating system. Then whether the positions of the respective preset marks are included in a region formed by the display position of the other window is judged. And if the positions of the preset marks are within the above region, then it is determined that the preset marks are blocked. Otherwise, the preset marks are not blocked.

As one implementation, among the plurality of preset marks, if a proportion of the preset marks which are blocked is smaller than a preset proportion threshold, it can be determined that the above online content is running in the foreground. The preset proportion threshold herein can be set according to a specific application scenario, and is not limited herein. Illustratively, the above predetermined proportion threshold can be, for example, 30%, 50%, etc.

As another implementation, if the plurality of preset marks in the central area are not blocked, it can be determined that the online content is running in the foreground.

S305: determining, in response to determining that the online content is running in the foreground, that the online content is a currently shared content.

In some application scenarios, the content of the currently shared content can include the above online content, as well as other shared content.

S306, providing, in response to determining that the online content exists in the currently displayed content and that the online content is a currently shared content, a sharee with access information for accessing the online content based on an access authority of the sharee.

For the specific implementation of the above step S306, reference may be made to related parts of the embodiment shown in FIG. 2, which is not described herein again.

Compared with the embodiment shown in FIG. 2, the present embodiment further describes the steps of determining the online content in the screen and determining that the online content is the shared content, so that the online content in the screen and the shared content of the online content can be automatically and quickly recognized during the screen sharing. Thus, the above access information can be provided to the sharee without manual operation or with less manual operations, the efficiency of providing the above access information to the sharee can be increased, and it is advantageous for the sharee to timely and freely browse the online content during the screen sharing.

In some optional implementations of the embodiments shown in FIG. 2 and FIG. 3, the information processing method further includes the following steps:

firstly, presenting to a sharer authorization prompt information which is used for prompting to authorize a sharee to access the above online content.

In these embodiments, the above authorization prompt information can be presented during the screen sharing, or can be presented before the screen sharing is initiated.

Taking screen sharing in a multimedia conference as an example, in some application scenarios, the above authorization prompt information can be presented after a sharer initiates screen sharing in the multimedia conference and it is determined that the above online content is a shared content. In some other application scenarios, the above authorization prompt information can be authorization prompt information presented in a multimedia conference before screen sharing. In some other application scenarios, the above authorization prompt information can also be authorization prompt information displayed in a schedule corresponding to the multimedia conference.

The above authorization prompt information can include identification information of an online content that meets a preset condition, or information merely prompting to authorize the sharee with the currently shared/to-be-shared online content.

By presenting the above authorization prompt information to the sharer, the sharer can timely authorize the sharee to access the above online content according to the prompt information.

Secondly, sending, in response to receiving an authorization operation issued according to the authorization prompt information, authorization information to a server so that the server sends access prompt information to the sharee according to the authorization information, the access prompt information being used for prompting to access the online content.

As one implementation, the above authorization prompt information can include an authorization control for authorization. When a user performs a trigger operation on the above control, it can be considered that the sharer issues an authorization operation.

The above execution subject can send authorization information to the server according to the above authorization operation. The server sends access prompt information to the sharee according to the above authorization information.

In some embodiments, the above access prompt information can carry information of the online content, such as an identification of the online content or a network storage address.

In these embodiments, by presenting the authorization prompt information to the sharer, executing, by the sharer, an authorization operation according to the authorization prompt information, and then sending the authorization information to the server, so as to provide the sharee with a function of freely browsing the online content after obtaining authorization of the sharer, which can improve information safety for the online content.

In some embodiments, the method further includes:

presenting, in response to determining that the currently shared online content includes two or more online contents, to the sharer prompt information for prompting to authorize the sharee to access the two or more online contents.

In these embodiments, when the above execution subject determines that the currently shared online content includes two or more online contents according to the related parts of the embodiment shown in FIG. 2 or the embodiment shown in FIG. 3, the prompt information presented to the sharer can prompt the sharer to authorize the two or more online contents.

As one implementation, one piece of authorization prompt information can be presented for each online content. In such implementation, since one piece of authorization prompt information is presented for each online content, it is helpful for the sharer to respectively perform control of whether the sharee is provided with an access authority for each online content.

As one implementation, the two or more online contents can be presented by one piece of authorization prompt information. In other words, the sharer is simultaneously reminded of whether to share the two or more online contents in one piece of authorization prompt information. In such implementation, the sharer can browse, at one time, to provide authorization prompt information for the two or more online contents, and can provide the access authority to the sharee for the two online contents simultaneously through an one-time authorization operation.

Please refer to FIG. 4, which illustrates a schematic flowchart of an information processing method provided by the present disclosure. As shown in FIG. 4, the information processing method includes the following steps of:

S401: receiving information of a currently shared content sent by a sharer client, and forwarding the information of the currently shared content to a sharee client, so that the sharee client displays the currently shared content.

An execution subject of the present embodiment can be a server that provides a service for screen sharing.

The above server can receive encoded information of the shared content sent by the sharer client in a manner of a data stream. The server then forwards the above information of the currently shared content to each sharee.

After receiving the above data stream, the sharee client can decode the data stream, reconstruct a picture of the currently shared content, and display the above picture.

S402: receiving, in response to the currently shared content including an online content that meets a preset condition, access information which is sent by the sharer client and used for accessing the online content.

The sharer client can determine whether the currently shared content includes the online content based on the related implementation in the embodiment shown in FIG. 2 or FIG. 3. After determining that the currently shared content includes the online content, the sharer client can determine whether the sharee has the access authority. The above authority of the sharee can be automatically authorized by the server, or can be authorized by the sharer, or can be authorized by other related user of the online content.

In some application scenarios, the above access information sent by the sharer client can include identification information of the online content.

S403: sending access prompt information to the sharee client so that the sharee accesses the online content based on the access prompt information.

After receiving the above access information, the above execution subject can acquire a network storage address corresponding to the online content. Then access prompt information is generated according to the above network storage address. Illustratively, the above access prompt information can be associated with the above network storage address.

The access prompt information herein can be used for prompting the sharee to access the above online content. For example, the sharee can be prompted to autonomously access the above online content according to the operation of the home end, without being limited to the sharer's presentation part of the screen for the online content.

In some embodiments, the above information processing method further includes:

sending switch entry display information to the sharee client, so that the sharee client is based on displaying of a switch entry, for the sharee to switch from the currently shared content to the online content accessed based on the access authority through the switch entry; the switch entry display information being used for indicating a network storage address of the online content.

In these embodiments, after receiving the above switch entry display information, the switch entry can be presented in a terminal device (client) of the sharee. The switch entry can be associated with a network storage address of the online content.

When the sharee executes a trigger operation on the switch entry in the client used by the sharee, the client can open a webpage of the above online content through the above network storage address, thereby to switch the currently shared content (sharer screen picture) displayed in the client to the online content which is opened according to the network storage address and can be freely browsed.

In some embodiments, when two or more online contents exist, the above server can generate respective switch entry display information according to access information of each online content sent by the sharer client.

For each piece of switch entry display information, after receiving the switch entry display information, the sharee client can determine the online content corresponding to the switch entry display information, generate a corresponding switch entry for the switch entry display information, and associate the corresponding switch entry with the network storage address corresponding to the switch entry display information. Then the client displays the switch entry in a display region of the online content.

When the sharee executes a trigger operation on one of the switch entries, the client can open the webpage of the online content corresponding to the switch information through the network storage address associated with the switch entry, thereby to switch the currently shared content (sharer screen picture) displayed in the client to the online content which is opened according to the network storage address and can be freely browsed.

In the present embodiment, by receiving information of a currently shared content sent by a sharer client, and forwarding the information of the currently shared content to a sharee client, so that the sharee client displays the currently shared content; receiving, in response to the currently shared content including an online content, access information which is sent by the sharer client and used for accessing the online content; sending access prompt information to the sharee client so that the sharee accesses the online content based on the access prompt information. Thus, a function that the sharee can autonomously browse the online content during performing, by the sharer, content sharing through the screen sharing is realized. Since the sharee can autonomously access and browse the online content, the displaying of the online content at the sharee end is not influenced any more by the definition of the screen of the sharer, the encoding and decoding algorithm, and the network bandwidth for transmitting screen pictures, the above online content can be clearly displayed, and the problem of a poor definition of the shared content during the screen sharing is solved to a certain extent. In addition, since the sharee can freely browse the online content according to the above access information, the visibility of the online content which is a shared content is not limited by the sharer client any more. The problems that the content visibility of the sharee end is limited by the sharer client and the sharee has a low degree of freedom during screen sharing are solved to a certain extent.

Please refer to FIG. 5, which illustrates a schematic flowchart of an information processing method provided by the present disclosure. As shown in FIG. 5, the information processing method includes the following steps of:

S501: receiving and displaying, when a sharer shares a screen, a currently shared content in the screen of the sharer.

An execution subject in the present embodiment can be a terminal device used by the sharee, and specifically, can be a client that the sharee uses to display the shared screen of the sharer. Illustratively, the above client can be a multimedia conference client.

S502: receiving and displaying, in response to the currently shared content including an online content that meets a preset condition, access prompt information sent by a server; wherein, the access prompt information is generated by the server based on the access information, and the access information is used for accessing the online content.

The sharer client can determine whether the currently shared content includes the online content based on the related implementation in the embodiment shown in FIG. 2 or FIG. 3. Optionally or additionally, whether the sharee is given the access authority to access these online contents can be further determined. The above authority of the sharee can be automatically authorized by the server, or can be authorized by the sharer, or can be authorized by other related user of the online content. When it is determined that the sharee has the access authority for the online content, the sharer client sends access information for accessing the online content to the server. The server can generate access prompt information according to the access information.

The above access prompt information can be displayed in a display region of the online content of the above client.

S503: displaying, in response to receiving an access operation executed according to the access prompt information, the online content opened based on a network storage address of the online content.

The sharee can execute the access operation for the online content according to the above access prompt information.

As one implementation, the above access prompt information can carry the above network storage address corresponding to the online content. The sharee can execute the access operation based on the network storage address. The above access operation can be, for example, an operation of inputting the above network storage address to a window.

In some embodiments, the step S503 includes the following sub-steps:

firstly, displaying a switch entry in response to receiving switch entry display information, wherein the switch entry display information can be used for indicating a network storage address of the online content, and the switch entry is associated with the network storage address;

secondly, accessing, in response to receiving a trigger operation executed by the sharee on the switch entry, the online content based on the network storage address.

In these embodiments, the above switch entry display information can be used for indicating the network storage address of the online content.

The above switch entry can include a text, a symbol, or a graph. For the online content, the above execution subject can associate the switch entry corresponding to the online content with the network storage address of the online content.

In these embodiments, the sharee client displays the switch entry by providing the switch entry display information to the sharee, so that the sharee can open the online content through the above switch entry according to the network storage address, and the operation of the sharee is simplified.

In some embodiments, the step S503 includes: switching, in a window displaying the currently shared content, the currently shared content to the online content opened based on the network storage address of the online content.

In these embodiments, after receiving the above access operation, the above execution subject can directly switch the currently shared content to the online content opened based on the network storage address in a window displaying the currently shared content. Therefore, the sharee client has no need to use other window to display the online content, and display space on the screen of the terminal device of the sharee can be saved.

Figure 7:
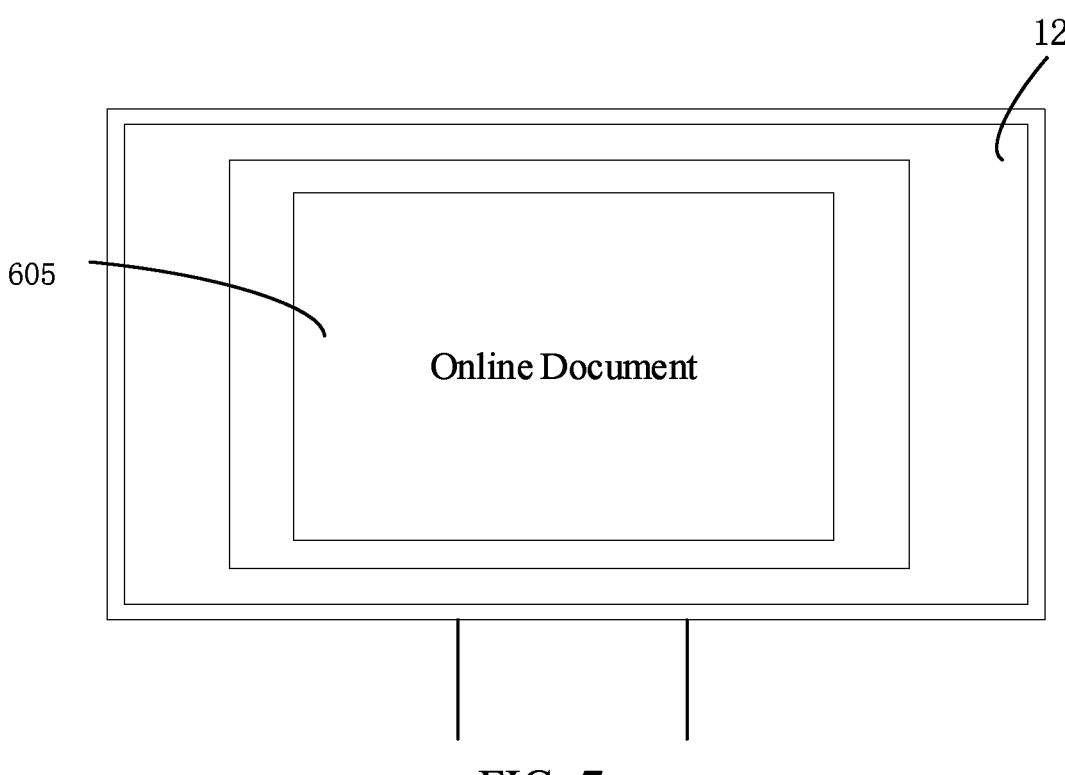
FIG. 7 is a schematic diagram of an application scenario.

Please refer to FIG. 6 and FIG. 7, which respectively illustrate displayed contents on the screen of the terminal device of the sharee in the scenario shown in FIG. 1.

When the sharer shares the screen, a display interface 60 of the client can be displayed on a screen 12 of the sharee. The shared content of the terminal device used by the sharer during screen sharing can be displayed in the display interface 60. The above shared content is displayed in form of a picture including an image 602 and an online document 603. The sharee client receives the switch entry display information and can present a switch entry 604 in the display interface 60. The switch entry 604 is associated with a network storage address of the online document.

When the sharee executes a trigger operation on the switch entry 604, the sharee client accesses the above online document through the network storage address, and displays the online document 605 in the display interface of the client. The online document 605 is opened based on the above network storage address.

In some other embodiments, the step S503 includes: opening a new display window to display the online content opened based on the network storage address.

In these embodiments, after receiving the above access operation, the above execution subject can create a new window using a window creation interface provided by the system. The online content opened based on the network storage address is displayed in the new window. Therefore, the sharee can simultaneously browse the currently shared content of the sharer and the online content opened based on the network storage address, which is advantageous for the sharee to browse the above online content according to a sharing progress of the sharer.

In some embodiments, the currently shared content includes two or more online contents, and the receiving and displaying the switch information includes:

firstly, receiving switch entry display information corresponding to two or more online contents respectively;

secondly, displaying, for each of the online contents, a switch entry corresponding to the online content in a display region corresponding to the online content, according to the switch entry display information.

When two or more online contents exist, the above server can generate corresponding switch entry display information, according to access information for the respective online content sent by the sharer client, and send the above switch entry display information corresponding to the respective online content to the sharee client. Each piece of switch entry display information can be used for indicating a network storage address of a corresponding online content. After receiving the above two or more pieces of switch entry display information, the above execution subject can generate a switch entry for each piece of switch entry display information, and associate the switch entry with the network storage address indicated by the switch entry display information. The switch entry is displayed in a display region of the online content corresponding to the switch information.

Figure 8:
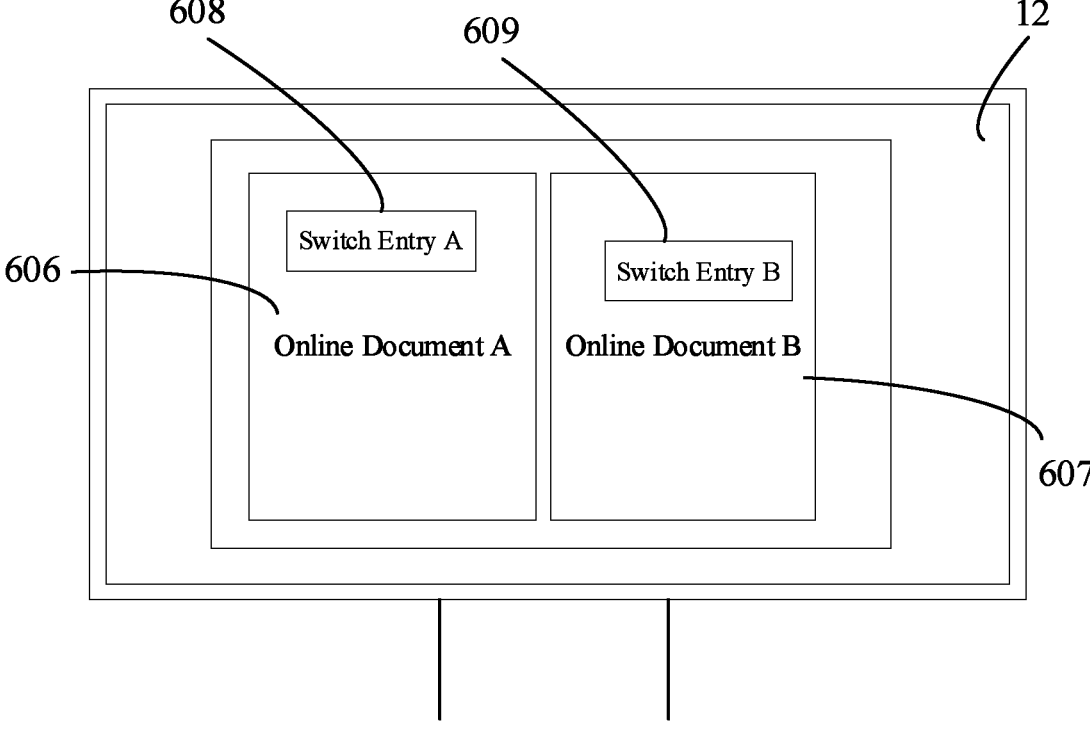
FIG. 8 is a schematic diagram of an application scenario.

Please refer to FIG. 8, which illustrates a schematic diagram of an application scenario. As shown in FIG. 8, there are two online documents that the sharer shares. The display interface of the client can be displayed on the screen 12 of the sharee. Pictures of the two online documents (online document A (606) and online document B (607)) can be displayed in the display interface 60. The above two online documents in the shared content are displayed in form of pictures. The sharee client receives the two pieces of switch entry display information, and the switch entry A (608) and switch entry B (609) can be presented in the display interface.

In these embodiments, the above accessing, in response to receiving a trigger operation executed by the sharee on the switch entry, the online content based on the network storage address, includes:

accessing, in response to receiving a trigger operation executed by the sharee on a switch entry displayed on a preset content, the online content based on the network storage address associated with the switch entry.

When the sharee executes the trigger operation on one of the switch entries, the client determines a network storage address associated with the switch entry and opens the online content according to the network storage address. Thereby the currently shared content (sharer screen picture) displayed in the client is switched to the online content which is opened according to the network storage address and can be freely browsed.

In the present embodiment, by receiving and displaying, when a sharer shares a screen, a currently shared content in the screen of the sharer; receiving and displaying, in response to the currently shared content including an online content that meets a preset condition, access prompt information sent by a server, wherein the access prompt information is generated by the server based on access information which is used for accessing the online content; and displaying, in response to receiving an access operation executed according to the access prompt information, the online content opened based on a network storage address of the online content, a function that the sharee can autonomously browse the online content during performing, by the sharer, content sharing through the screen sharing is thus realized. Since the sharee can autonomously access and browse the online content, the displaying of the online content at the sharee end is not influenced any more by the definition of the screen of the sharer, the encoding and decoding algorithm, and the network bandwidth for transmitting screen pictures, the above online content can be clearly displayed, and the problem of a poor definition of the shared content during the screen sharing is solved to a certain extent. In addition, since the sharee can freely browse the online content according to the above access information, the visibility of the online content which is a shared content is not limited by the sharer client any more. The problems that the content visibility of the sharee end is limited by the sharer client and the sharee has a low degree of freedom during screen sharing are solved to a certain extent.

Figure 9:
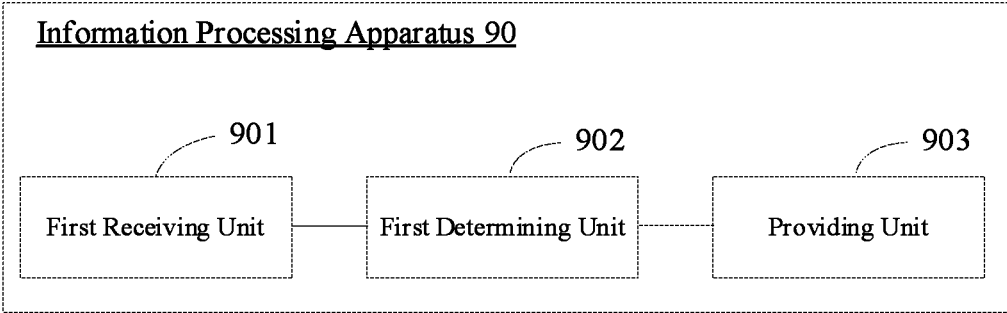
FIG. 9 is a structural block diagram of an information processing apparatus provided by an embodiment of the present disclosure.

Corresponding to the information processing method of the embodiment of FIG. 1 in the above, FIG. 9 is a structural block diagram of an information processing apparatus provided by an embodiment of the present disclosure. For convenience of illustration, only parts related to the embodiment of the present disclosure are shown. Referring to FIG. 9, the apparatus 90 includes: a first receiving unit 901, a first determining unit 902 and a providing unit 903, wherein, the first receiving unit 901 is used for receiving screen sharing request information;

the first determining unit 902 is used for determining, by the screen sharing request information, whether an online content that meets a preset condition exists in a currently displayed content in a screen;

the providing unit 903 is used for providing, in response to determining that the online content exists in the currently displayed content and that the online content is a currently shared content, a sharee with access information for accessing the online preset content based on an access authority of the sharee.

In one embodiment of the present disclosure, the first determining unit 902 is further used for:

acquiring a first displayed content currently opened by using a browser in the screen;

acquiring identification information corresponding to the first displayed content, and determining whether the first displayed content is the online content according to the identification information.

In one embodiment of the present disclosure, the first determining unit 902 is further used for: detecting whether a steganographic character exists in the identification information;

determining, in response to detecting that the steganographic character exists in the identification information, whether the first displayed content is the online content according to the steganographic character.

In one embodiment of the present disclosure, the information processing apparatus 90 further includes a second determining unit (not shown in the figure). The second determining unit is used for:

determining whether the online content is running in the foreground;

determining, in response to determining that the online content is running in the foreground, that the online content is the currently shared content.

In one embodiment of the present disclosure, the second determining unit is further used for: determining an area of a browser window displaying the online content, which is blocked by other windows;

determining a ratio of the browser window which is blocked according to the area;

determining, in response to determining that the ratio is smaller than a preset ratio threshold, that the online content is running in the foreground.

In one embodiment of the present disclosure, the second determining unit is further used for:

dynamically setting a plurality of preset marks for a window displaying the online content;

determining, based on blocking information that the plurality of preset marks are blocked by other windows, that the online content is running in the foreground.

In one embodiment of the present disclosure, the information processing apparatus 90 further includes an authorizing unit (not shown in the figure). The authorizing unit is used for:

presenting to a sharer authorization prompt information which is used for prompting to authorize a sharee to access the online content;

sending, in response to receiving an authorization operation issued according to the authorization prompt information, authorization information to a server so that the server sends access prompt information to the sharee according to the authorization information, the access prompt information being used for prompting to access the online content.

In one embodiment of the present disclosure, the authorizing unit is further used for:

presenting, in response to determining that the currently shared online content includes two or more online contents, to the sharer prompt information for prompting to authorize the sharee to access the two or more online contents.

Figure 10:
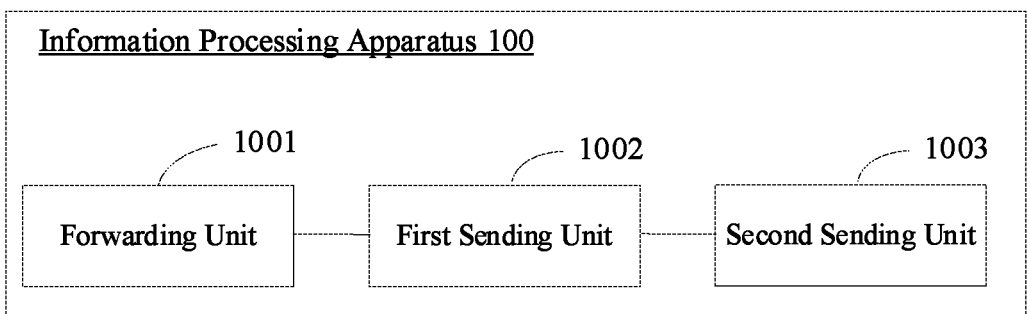
FIG. 10 is a structural block diagram of an information processing apparatus provided by an embodiment of the present disclosure.

Corresponding to the information processing method of the embodiment as shown in FIG. 4 above, FIG. 10 is a structural block diagram of an information processing apparatus provided by an embodiment of the present disclosure. For convenience of illustration, only parts related to the embodiment of the present disclosure are shown. Referring to FIG. 10, the apparatus 100 includes: a forwarding unit 1001, a first sending unit 1002, and a second sending unit 1003, wherein, the forwarding unit 1001 is used for receiving information of a currently shared content sent by a sharer client, and forwarding the information of the currently shared content to a sharee client, so that the sharee client displays the currently shared content;

the first sending unit 1002 is used for receiving, in response to the currently shared content including an online content that meets a preset condition, access information which is sent by the sharer client and used for accessing the online content;

the second sending unit 1003 is used for sending the access prompt information to the sharee client, so that the sharee accesses the online content based on the access prompt information.

In one embodiment of the present disclosure, the second sending unit 1003 is further used for: sending switch entry display information to the sharee client, so that the sharee client is used, based on displaying of a switch entry, for the sharee to switch from the currently shared content to the online content accessed based on the access authority through the switch entry, the switch entry display information being used for indicating a network storage address of the online content.

Figure 11:
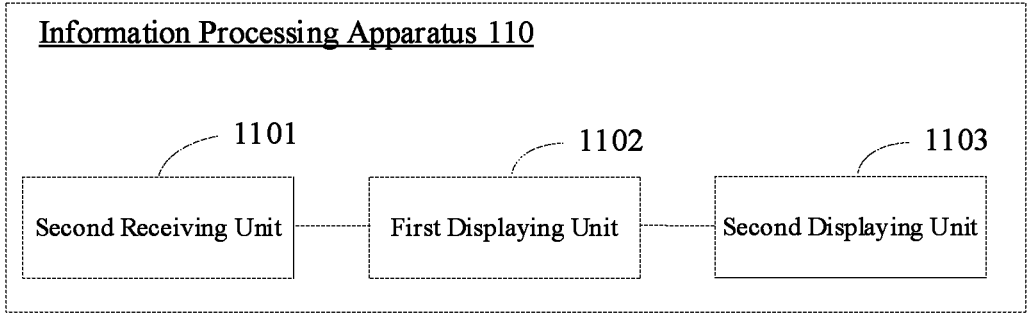
FIG. 11 is a structural block diagram of an information processing apparatus provided by an embodiment of the present disclosure.

Corresponding to the information processing method of the embodiment of FIG. 5 above, FIG. 11 is a structural block diagram of an information processing apparatus provided by an embodiment of the present disclosure. For convenience of illustration, only parts related to the embodiment of the present disclosure are shown. Referring to FIG. 11, the apparatus 110 includes: a second receiving unit 1101, a first displaying unit 1102, and a second displaying unit 1103, wherein, the second receiving unit 1101 is used for receiving and displaying, when a sharer shares a screen, a currently shared content in the screen of the sharer;

the first displaying unit 1102 is used for receiving and displaying, in response to the currently shared content including the online content, access prompt information sent by a server, wherein, the access prompt information is generated by the server based on the access information which is used for accessing the online content;

the second display unit 1103 is used for displaying, in response to receiving an access operation executed according to the access prompt information, the online content opened based on a network storage address of the online content.

In one embodiment of the present disclosure, the second displaying unit 1103 is used for:

displaying a switch entry in response to receiving switch entry display information, wherein the switch entry display information includes a network storage address of the online content, and the switch entry is associated with the network storage address;

accessing, in response to receiving a trigger operation executed by the sharee on the switch entry, the online content based on the network storage address.

In one embodiment of the present disclosure, the second displaying unit 1103 is further used for:

switching, in a window displaying the currently shared content, the currently shared content to the online content opened based on the network storage address; or opening a new display window to display the online content opened based on the network storage address.

In one embodiment of the present disclosure, the currently shared content includes two or more online contents, and the second displaying unit 1103 is further used for:

receiving switch entry display information corresponding to two or more online contents respectively;

displaying, for each of the online contents, a switch entry corresponding to the online content in a display region corresponding to the online content, according to the switch entry display information;

accessing, in response to receiving a trigger operation executed by the sharee on a target switch entry, the online content based on the network storage address associated with the target switch entry.

In order to implement the above embodiments, an embodiment of the present disclosure further provides an electronic device.

Figure 12:
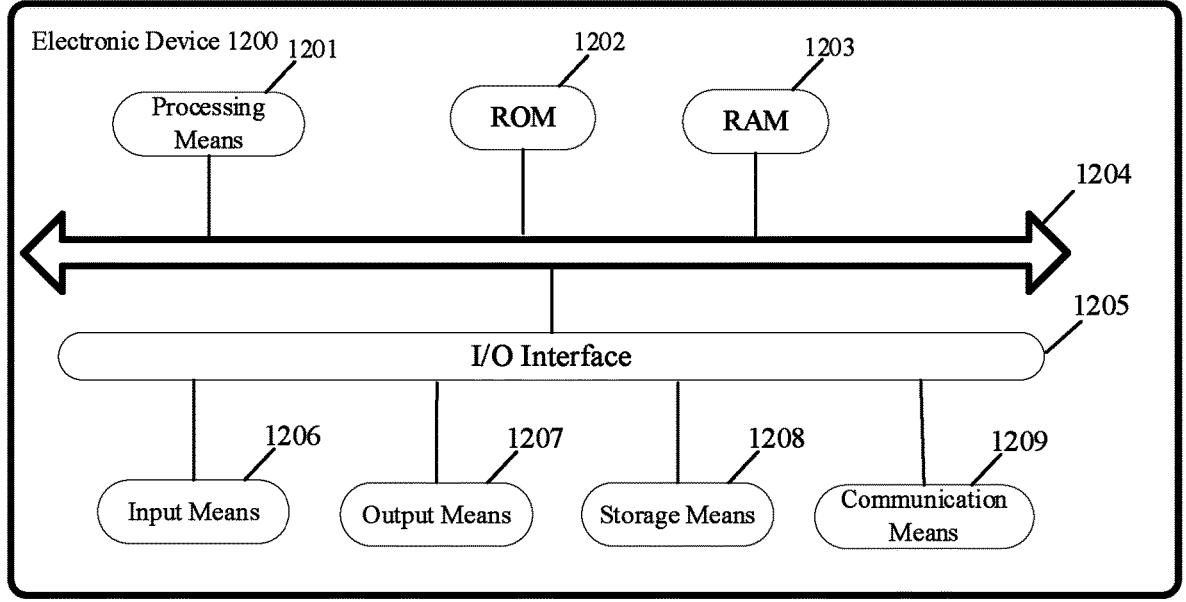
FIG. 12 is a schematic diagram of a hardware structure of an electronic device provided by an embodiment of the present disclosure.

Refer to FIG. 12, which shows a structural schematic diagram of FIG. 12 of an electronic device adapted for implementing the embodiment of the present disclosure. An electronic device 1200 can be a terminal device or a server, wherein the terminal device can include, but is not limited to, a mobile terminal such as a mobile phone, a notebook computer, a Digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., as well as a fixed terminal such as a Digital TV, a desktop computer, etc. The electronic device shown in FIG. 12 is only an example, and should not bring any limitation to the functions and the scope of use of the embodiments of the present disclosure.

As shown in FIG. 12, the electronic device 1200 can include a processing means (e.g., a central processing unit, a graphics processor, etc.) 1201, which can execute various appropriate actions and processes according to a program stored in a Read Only Memory (ROM) 1202 or a program loaded from a storage device 1208 into a Random Access Memory (RAM) 1203. In the RAM 1203, various programs and data required for the operation of the electronic device 1200 are also stored. The processing means 1201, the ROM 1202, and the RAM 1203 are connected to each other via a bus 1204. An input/output (I/O) interface 1205 is also connected to the bus 1204.

Generally, the following means can be connected to the I/O interface 1205: an input means 1206 including, for example, a touch screen, a touch pad, a keyboard, a mouse, a camera, a microphone, an accelerometer, a gyroscope, and the like; an output means 1207 including, for example, a Liquid Crystal Display (LCD), a speaker, a vibrator, and the like; a storage means 1208 including, for example, a magnetic tape, a hard disk, and the like; and a communication means 1209. The communication means 1209 can allow the electronic device 1200 to be in wireless or wired communication with other device to exchange data. While FIG. 12 illustrates an electronic device 1200 having various means, it should be understood that not all illustrated means are required to be implemented or provided. More or fewer means can be alternatively implemented or provided.

In particular, the processes described above with reference to the flowcharts can be implemented as computer software programs, according to the embodiment of the present disclosure. For example, the embodiment of the present disclosure includes a computer program product including a computer program carried on a computer readable medium, the computer program containing program code for executing the method shown in the flowchart. In such an embodiment, the computer program can be downloaded and installed from a network through the communication means 1209, or installed from the storage means 1208, or installed from the ROM 1202. The computer program, when being executed by the processing means 1201, executes the above functions defined in the method of the embodiments of the present disclosure.

It should be noted that the above computer readable medium of the present disclosure can be a computer readable signal medium or a computer readable storage medium or any combination of both of the above. The computer readable storage medium can be, for example, but is not limited to, an electronic, magnetic, optical, electromagnetic, infrared, or semiconductor system, apparatus, or device, or any combination of the above. More specific examples of the computer readable storage medium can include, but are not limited to: an electrical connection having one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage component, a magnetic storage component, or any appropriate combination of the above. In the present disclosure, the computer readable storage medium can be any tangible medium containing or storing a program for use by or in combination with an instruction execution system, apparatus, or device. In contrast, in the present disclosure, a computer readable signal medium can include a data signal propagated in baseband or as part of carrier wave, with computer readable program code carried therein. Such a propagated data signal can take any of a variety of forms, including, but not limited to, an electro-magnetic signal, an optical signal, or any appropriate combination of the above. The computer readable signal medium can also be any computer readable medium other than a computer readable storage medium, and can send, propagate, or transport a program for use by or in combination with an instruction execution system, apparatus, or device. Program code contained in a computer readable medium can be transported using any appropriate medium, including but not limited to: electrical wires, optical cables, RF (radio frequency), etc., or any appropriate combination of the above.

The above computer readable medium can be contained in the above electronic device, or can be separate and not incorporated into the electronic device.

The above computer readable medium carries one or more programs which, when being executed by the electronic device, cause the electronic device to execute the method shown in the above embodiments.

Computer program code for executing operations of the present disclosure can be written in one or more programming languages or a combination thereof, including an object oriented programming language such as Java, Smalltalk, C++, as well as a conventional procedural programming language such as a "C" programming language or similar programming languages. The program code can be executed entirely on a user computer, partly on the user computer, as a stand-alone software package, partly on the user computer and partly on a remote computer, or entirely on the remote computer or a server. In the scenario where a remote computer is involved, the remote computer can be connected to the user computer via any type of network, including a Local Area Network (LAN) or a Wide Area Network (WAN), or can be connected to an external computer (for example, connected via the Internet using an Internet service provider).

The flowcharts and block diagrams in the figures illustrate the architecture, functionality, and operation of possible implementations of the system, method and computer program product in accordance with various embodiments of the present disclosure. In this regard, each block in the flowcharts or block diagrams can represent a module, a segment of program, or part of code, which contains one or more executable instructions for implementing the specified logical function(s). It should also be noted that, in some alternative implementations, the functions labeled in the block can also occur out of the order labeled in the figures. For example, two blocks shown in succession can, in fact, be executed substantially concurrently, or they can sometimes be executed in a reverse order, depending upon the functionality involved. It should also be noted that each or a combination of blocks of the block diagrams and/or flowcharts can be implemented by special purpose hardware-based systems that execute the specified functions or operations, or implemented by a combination of special purpose hardware and computer instructions.

The involved units described in the embodiments of the present disclosure can be implemented by means of software or hardware. In particular, a name of a unit does not constitute a limitation on the unit itself in some cases, for example, the first receiving unit can also be described as "a unit that receives screen sharing request information".

The functions described herein above can be executed, at least in part, by one or more hardware logic parts. For example, without limitation, exemplary types of hardware logic parts that can be used include: field Programmable Gate Arrays (FPGAs), Application Specific Integrated Circuits (ASICs), Application Specific Standard Products (ASSPs), system on a chip (SOC), Complex Programmable Logic Devices (CPLDs), and the like.

In the context of the present disclosure, a machine readable medium can be a tangible medium that can contain or store a program for use by or in combination with an instruction execution system, apparatus, or device. The machine readable medium can be a machine readable signal medium or a machine readable storage medium. The machine readable medium can include, but is not limited to, an electronic, magnetic, optical, electromagnetic, infrared, or semiconductor system, apparatus, or device, or any appropriate combination of the above. More specific examples of the machine readable storage medium would include an electrical connection based on one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage device, a magnetic storage device, or any appropriate combination of the above.

The above description is only an illustration of the preferred embodiments of the present disclosure and the technical principles employed. It should be appreciated by those skilled in the art that the disclosure scope involved in the present disclosure is not limited to a technical solution formed by a particular combination of the above technical features, but also encompass other technical solution(s) formed by any combination of the above technical features or equivalents thereof without departing from the spirit of the above disclosure. For example, a technical solution formed by a mutual replacement of the above features and the technical features disclosed in the present disclosure (but not limited to) having similar functions.

Further, while various operations are depicted in a particular order, this should not be understood as requiring such operations to be executed in the particular order shown or in a sequential order. Under certain circumstances, multitasking and parallel processing can be advantageous. Likewise, while several specific implementation details are contained in the above discussion, these should not be construed as limitations on the scope of the present disclosure. Certain features that are described in the context of a separate embodiment can also be implemented in combination in a single embodiment. Conversely, various features that are described in the context of a single embodiment can also be implemented in multiple embodiments separately or in any appropriate subcombination.

Although the present subject matter has been described in a language specific to structural features and/or methodological actions, it should be understood that the subject matter defined in the appended Claims is not necessarily limited to the specific features or actions described above. Rather, the specific features and actions described above are only example forms of implementing the Claims.

The invention claimed is:

1. An information processing method, comprising:
receiving screen sharing request information;
determining, by the screen sharing request information, whether an online content that meets a preset condition exists in a currently displayed content in a screen;
providing, in response to determining that the online content exists in the currently displayed content and that the online content is a currently shared content, a sharee with access information for accessing the online content based on an access authority of the sharee,
wherein the determining that the online content is the currently shared content comprises determining that the online content is running in a foreground, and
wherein the determining that the online content is running in the foreground comprises:
determining an area of a browser window displaying the online content that is blocked by other windows;
determining a ratio of the browser window that is blocked according to the area; and
in response to determining that the ratio is smaller than a preset ratio threshold, determining that the online content is running in the foreground.

2. The method according to claim 1, wherein the determining, by the screen sharing request information, whether an online content that meets a preset condition exists in a currently displayed content in a screen comprises:
acquiring a first displayed content currently opened by using a browser in the screen;
acquiring identification information corresponding to the first displayed content; and
determining whether the first displayed content is the online content according to the identification information.

3. The method according to claim 2, wherein determining whether the first displayed content is the online content according to the identification information comprises:
detecting whether a steganographic character exists in the identification information; and
determining, in response to detecting that the steganographic character exists in the identification information, whether the first displayed content is the online content according to the steganographic character.

4. The method according to claim 1, wherein the method further comprises:
presenting to a sharer authorization prompt information which is used for prompting to authorize a sharee to access the online content; and
sending, in response to receiving an authorization operation issued according to the authorization prompt information, authorization information to a server, so that the server sends access prompt information to the sharee according to the authorization information, the access prompt information being used for prompting to access the online content.

5. The method according to claim 4, wherein the method further comprises:

presenting, in response to determining that the currently shared online content includes two or more online contents, to the sharer prompt information for prompting to authorize the sharee to access the two or more online contents.

6. An information processing method, comprising:

receiving information of a currently shared content sent by a sharer client, and forwarding the information of the currently shared content to a sharee client so that the sharee client displays the currently shared content;

receiving, in response to the currently shared content including an online content that meets a preset condition, access information which is sent by the sharer client and used for accessing the online content, wherein the currently shared content includes two or more online contents; and sending switch entry display information corresponding to the two or more online contents to the sharee client, so that the sharee client displays a switch entry corresponding to each of the online contents in a display region corresponding to the online content according to the switch entry display information and accesses, in response to receiving a trigger operation from the sharee client on a target switch entry, the online content based on a network storage address associated with the target switch entry.

7. The method according to claim 6, wherein the switch entry display information is configured for indicating the network storage address of the online content.

8. An information processing method, comprising:

receiving and displaying a currently shared content in the screen of a sharer;

receiving and displaying, in response to the currently shared content including an online content that meets a preset condition, access prompt information sent by a server, wherein the access prompt information is generated by the server based on access information, and the access information is used for accessing the online content, wherein the currently shared content includes two or more online contents;

receiving switch entry display information corresponding to the two or more online contents, respectively;

displaying, for each of the online contents, a switch entry corresponding to the online content in a display region corresponding to the online content, according to the switch entry display information; and accessing, in response to receiving a trigger operation on a target switch entry, the online content based on a network storage address associated with the target switch entry.

9. The method according to claim 8, wherein the accessing, in response to receiving a trigger operation executed by a sharee on a target switch entry, the online content based on the network storage address associated with the target switch entry comprises:

switching, in a window displaying the currently shared content, the currently shared content to the online content opened based on the network storage address; or opening a new display window to display the online content opened based on the network storage address.

10. An electronic device, comprising: a processor and a memory;

the memory storing computer executable instructions;

the processor executing the computer executable instructions stored in the memory, which enable the processor to execute the information processing method according to claim 1.

11. An electronic device, comprising: a processor and a memory;

the memory storing computer executable instructions;

the processor executing the computer executable instructions stored in the memory, which enable the processor to execute the information processing method according to claim 6.

12. An electronic device, characterized in comprising: a processor and a memory;

the memory storing computer executable instructions;

the processor executing the computer executable instructions stored in the memory, which enable the processor to execute the information processing method according to claim 8.

13. A non-transitory computer readable storage medium, wherein the computer readable storage medium stores therein computer executable instructions which, when executed by a processor, implement the information processing method according to claim 1.

14. A non-transitory computer readable storage medium, wherein the computer readable storage medium stores therein computer executable instructions which, when executed by a processor, implement the information processing method according to claim 6.

15. A non-transitory computer readable storage medium, wherein the computer readable storage medium stores therein computer executable instructions which, when executed by a processor, implement the information processing method according to claim 8.

16. An electronic device, comprising: a processor and a memory;

the memory storing computer executable instructions;

the processor executing the computer executable instructions stored in the memory, which enable the processor to execute the information processing method according to claim 2.

17. An electronic device, comprising: a processor and a memory;

the memory storing computer executable instructions;

the processor executing the computer executable instructions stored in the memory, which enable the processor to execute the information processing method according to claim 3.

18. An electronic device, comprising: a processor and a memory;

the memory storing computer executable instructions;

the processor executing the computer executable instructions stored in the memory, which enable the processor to execute the information processing method according to claim 4.

19. A non-transitory computer readable storage medium, wherein the computer readable storage medium stores therein computer executable instructions which, when executed by a processor, implement the information processing method according to claim 2.

20. A non-transitory computer readable storage medium, wherein the computer readable storage medium stores therein computer executable instructions which, when executed by a processor, implement the information processing method according to claim 3.

* * * * *